United States Patent [19]

Fah et al.

[11] Patent Number: 5,337,930

[45] Date of Patent: Aug. 16, 1994

[54] AUTOMATIC WATERING AND FEEDING MECHANISM FOR POTTED PLANTS

[76] Inventors: Jim Fah, 6 Tidcombe Crescent, Dowcaster East, Vic. 3109, Australia; Mike Lee, 43 Yerriw St., Balwyn, Australia, Vic. 3103

[21] Appl. No.: 946,668

[22] Filed: Sep. 18, 1992

[51] Int. Cl.⁵ .............................................. A01G 25/00
[52] U.S. Cl. .................................... 222/630; 47/79; 222/145; 222/262
[58] Field of Search .............. 222/630, 637, 145, 262, 222/389; 47/79

[56] References Cited

U.S. PATENT DOCUMENTS

| | | | |
|---|---|---|---|
| 3,595,442 | 7/1971 | Shapiro | 222/630 |
| 3,780,910 | 12/1973 | Wagner | 222/389 |
| 4,073,159 | 2/1978 | Trippi | 222/389 |

FOREIGN PATENT DOCUMENTS 1136986 9/1962 Fed. Rep. of Germany ...... 222/630

*Primary Examiner*—Henry E. Raduazo
*Attorney, Agent, or Firm*—Erik M. Arnheim

[57] ABSTRACT

A mechanism for supplying a dilute fertilizer solution to a multiple number of growing plants includes an apparatus for adding fertilizer concentrate to a stream of flowing water, such that a relatively constant ratio of fertilizer to water is achieved. Pressurized water is diverted from a water passage into a container to achieve a fertilizer pumping action. A bag-like membrane in the container forms a pressurized water space that is in pressure contact with a separate fertilizer-containment space. Fertilizer concentrate in contact with the membrane is thus pumpd out of the container and into a stream of water flowing through the water passage. A constriction is provided in the water passage to achieve a pressure drop that produces the desired pumping action.

7 Claims, 2 Drawing Sheets

5,337,930

AUTOMATIC WATERING AND FEEDING MECHANISM FOR POTTED PLANTS

BACKGROUND OF THE INVENTION

1. Field of the Invention

This invention relates to a mechanism for feeding and watering a multiple number of potted plants, e.g. flowers or vegetables.

2. Priof Developments

In my U.S. Pat. Nos. 4,864,771 and 4,557,071, I show two mechanisms for feeding and watering potted plants. In each case a fertilizer-admitting device is incorporated in each plant container, such that the fertilizer is mixed with water in a chamber system in (or near) the bottom wall of each container. The patented arrangements thus require a fertilizer water mixing apparatus in plants, said mechanism including a centrally located container containing liquid fertilizer concentrate, and a means for automatically pumping metered quantities of the fertilizer concentrate into a stream of water while the water is being supplied to the various plant containers. The water arriving at each plant container thus has a minor percentage of fertilizer therein, predetermined for desired plant growth.

In one form of the present invention a flexible bag-like chamber means is located within the centrally located container. Pressurized water is admitted to the bag, such that the fertilizer concentrate surrounding the bag is pumped to each plant container. The system uses one fertilizer-water mixing device for a large multiplicity of plant containers. In the earlier systems when there are a large number of plant containers there is a corresponding multiplicity of fertilizer-water mixing devices.

The present invention is concerned with a plant feeding and watering system wherein fertilizer is mixed with water to a desired concentration in a central mixing mechanism, that then supplies the water-fertilizer solution to a large number of growing plants. The system eliminates the need for a fertilizer-water mixing device in each plant container.

SUMMARY OF THE INVENTION

The present invention contemplates a mechanism for supplying a dilute fertilizer solution to a multiple number of growing the bag is pumped out of the container into the stream of water flowing to the various plant containers. The system is suitable for supplying a dilute fertilizer solution to a relatively large number of plant containers, e.g. one hundred such containers.

THE DRAWINGS

DESCRIPTION OF A PREFERRED EMBODIMENT OF THE INVENTION

Figures 1, 2, 3:
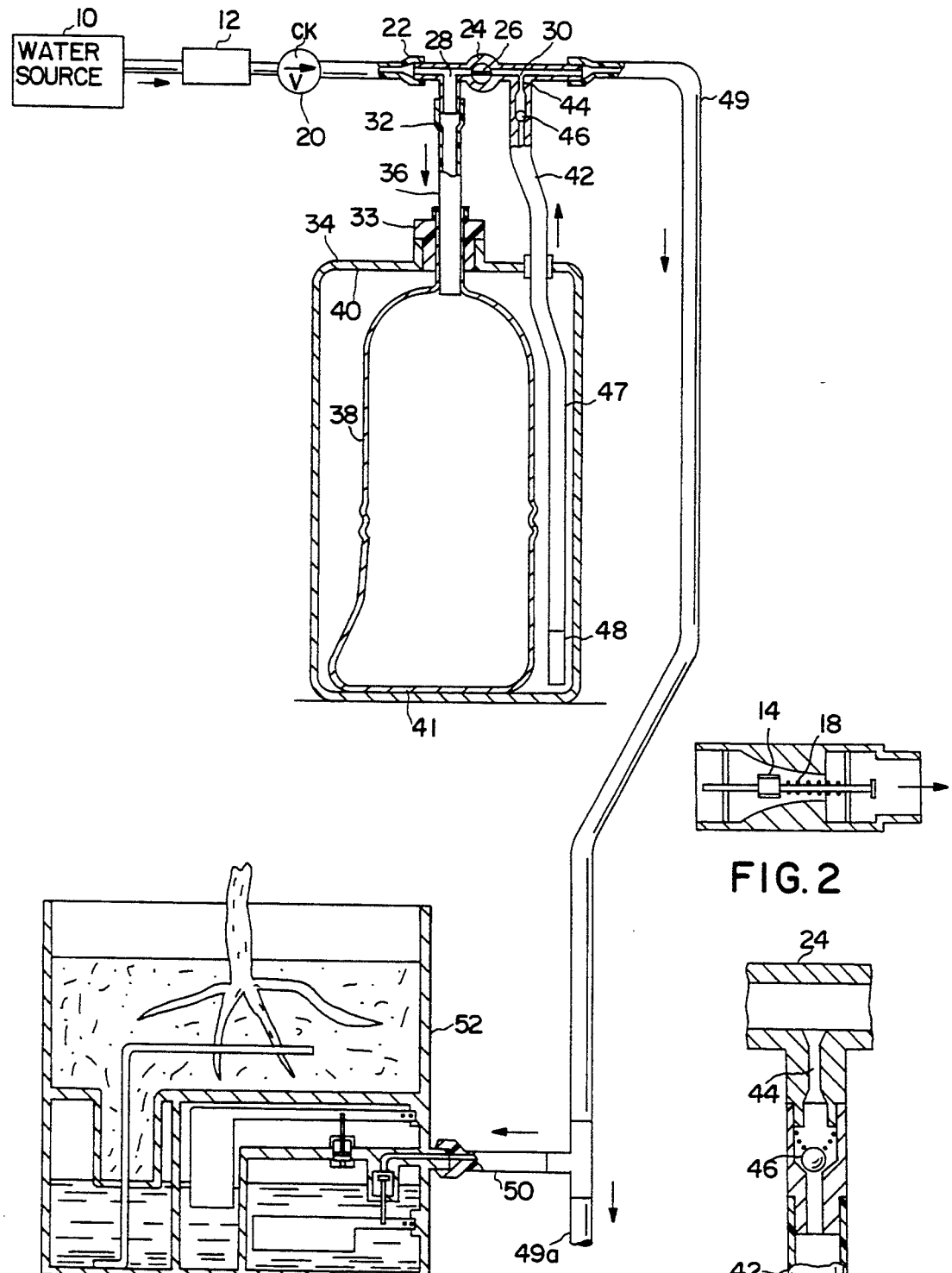
FIG. 1 is a view, partly in section, showing a plant watering and feeding system embodying the invention.
FIG. 2 is a fragmentary enlarged sectional view illustrating a structural component used in the FIG. 1 system.
FIG. 3 is an enlarged fragmentary sectional view of another structural feature used in the FIG. 1. system.

Referring to FIG. 1, there is shown a plant watering and feeding system that includes a water source 10 such as a conventional household water faucet that delivers water at some relatively high pressure, e.g. eighty p.s.i. The pressurized water is fed to a pressure-reducing valve 12 designed to reduce the pressure to a lower value, e.g. about fifteen p.s.i. Any suitable pressure regulator can be used. As shown in FIG. 2, the regulator comprises a flow-responsive plunger 14 located within a throat 16. A spring 18 urges the plunger in a right-to-left direction against the water pressure. The device constricts the water flow and reduces the water pressure.

Water, at a reduced pressure, flows through a check valve 20 contained in a water passage system 22. The system includes a housing 24 that mounts a butterfly valve 26; in this case the valve is used as a device to constrict the flow, and provide a pressure drop across the valve orifice. A handle connected to the butterfly vave element can be set at various adjusted positions to produce varying pressure drops across the valve orifice. For example, with a pressure in passage 28 upstream from valve 26 at about fifteen p.s.i., the valve may be adjusted to reduce the pressure in the downstream passage 30 to a valve of about ten p.s.i. The maximum valve 26 orifice dimension may be about four millimeter.

A branch line 32 extends from passage 28 through a plug-type closure 33 that is insertable into an upwardly open mouth formed in the top wall of an upstanding container 34. Branch line 32 includes a relatively rigid tubular section 36, to which is attached the neck portion of a flexible bag 38. The bag is shown in a partially expanded condition within container 34.

Prior to pressurizing the water passage system, the closure 33 is removed from the mouth of container 34; bag 38 is in a collapsed condition, such that it can be removed from the container with its attachment tube 36 and associated closure 33. Liquid fertilizer concentrate can be poured into the container to a level near the container top wall 40. The closure 33 is then inserted into the container mouth is that the collapsed bag is within the container i.e. immersed in the liquid fertilizer. When the water system is pressurized the water pressure, e.g. at fifteen p.s.i., will tend to expand the bag. As a result, the bag membrane (wall) will exert a pumping force on the fertilizer in the container space surrounding the bag.

A second branch line 42 extends downwardly from housing 24 into container 34. Line 42 communicates with the water passage in housing 24 at a point downstream from constriction 26. Line 42 includes a second constriction 44 and a check valve 46. Constriction 44 has a lesser cross sectional dimension than the valve 26 constriction. For example constriction 44 preferably has a cross-sectional area varying from a minimum value of about 0.2 millimeter to a maximum value of about 0.5 millimeter.

As shown best in FIG. 1, branch line 42 includes a flexible line 47 that extends downwardly through the top wall of container bottom wall 41. The lower end of line 47 mounts a strainer 48.

When the water passage system is pressurized the water pressure upstream from constriction 26 will tend to expand bag 38, such that the surrounding liquid fertilizer concentrate in container 34 will be pumped upwardly through branch line 42 to merge with the water flowing out of housing 24 into water line 49. Constriction 44 limits the flow of fertilizer in line 42, such that a relatively dilute fertilizer concentration is achieved.

Depending on the size of constriction 44, the liquid fertilizer in line 49 has a concentration of about one part liquid fertilizer per one hundred parts water. Constriction 44 could be an adjustable size constriction if it were desired to achieve different fertilizer concentrations in line 49.

The fertilizer pumping force is related to the pressure drop exerted by constriction 26. Assuming that the pressure drop does not vary, the pumping force will remain essentially constant while the fertilizer is being pumped out of container 34 through line 42. Bag 38 preferably has an expanded volume closely approximating the internal volume of container 34. Therefore the pumping force developed within the bag will continue until substantially all of the liquid fertilizer has been pumped out from the container. Since the pumping force remains essentially constant over the entire cycle, the fertilizer flow rate through line 42 will be essentially constant. The flow rate will not vary as the quantity of fertilizer in the container descreases. This is a desirable feature, as it produces a relatively constant fertilizer-water ratio in line 49.

As shown in FIG. 1, line 49 connects to a line 50 that leads to an individual plant container 52. Container 52 can be constructed generally similarly to the container shown and described in my issued U.S. Pat. No. 4,864,771; however the plant container construction of present FIG. 1 is somewhat simplified from the plant container structure of U.S. Pat. No. 4,864,771 in that no fertilizer-water mixing apparatus is required in the plant container. The water-fertilizer mixing operation is instead performed by the aforementioned bag 38 and associated container 34.

With the present arrangement a large multiplicity of plant containers 52 can be supplied with a water-fertilizer solution from a single centrally located mixing mechanism of the type shown in FIG. 1. As shown in FIG. 1, line 49 includes an additional section 49a leading to additional containers, not shown. In actual practice, a considerable number of plant containers, e.g. one hundred containers, can be supplied with water and fertilizer from a single mechanism of the type shown in FIG. 1. The various connecting lines can be low cost flexible tubing formed of rubber or plastic. Relatively low liquid pressures, e.g. approximately fifteen p.s.i., are used.

Container 34 and bag 38 can be reused, i.e. when fertilizer is completely exhausted from the container a new quantity of fertilizer concentrate can be poured into the container. However, in an alternate mode of operation the container and bag 38 can be a throw-away assembly suited for only a one-time use.

Figure 4:
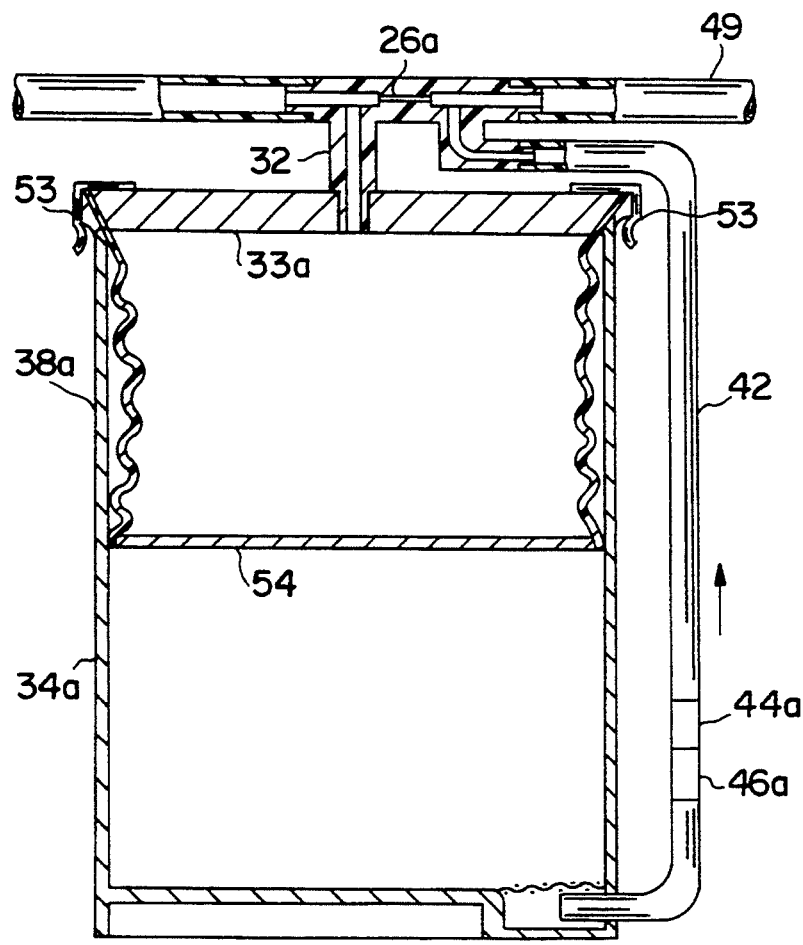
FIG. 4 is a sectional view through a second mechanism constructed according to the invention.

FIG. 4 shows another fertilizer-water mixing apparatus that can be used in practicing the invention. In this case the butterfly valve 26 is replaced by a non-adjustable constriction 26a. Also, the second branch line used to pump the fertilizer is located outside the fertilizer container.

Container 34a is provided with a removable lid 33a, whereby liquid fertilizer concentrate can be poured into the container. Spring clips 53 may be used to later clamp the lid on the container, as shown in FIG. 4. A flexible tubular bag 38a is attached to the peripheral edge of lid 33a so as to extend above the liquid fertilizer when the lid is replaced on the container. Bag 38a has a circular disk-like bottom wall 54 adapted to seat on the fertilizer liquid so as to act like a piston thereon. As the fertilizer level drops in the container the flexible bag side wall extends downwardly toward container bottom wall 41 so as to eventually lie against the side wall. The bag side wall has a bellows-like action. The maximum volumetric displacement of the bag is preferably about the same as that of container 34a.

Branch line 42a has a constriction and check valve therein, similar to constriction 44 and check valve 46 (FIG. 3). However, in this case the constriction 44a and check valve 46a are located in the flexible portion of the line. FIG. 1 is the preferred arrangement. FIG. 4 shows a less preferred location for the constriction and check valve.

The operation of the FIG. 4 mechanism is similar to that of the FIG. 1 mechanism. Water pressure applied through branch line 32a causes bag 34a to apply a pumping force on the liquid fertilizer to be pumped upwardly through line 42a for mixture with water flowing into line 49.

Figure 5:
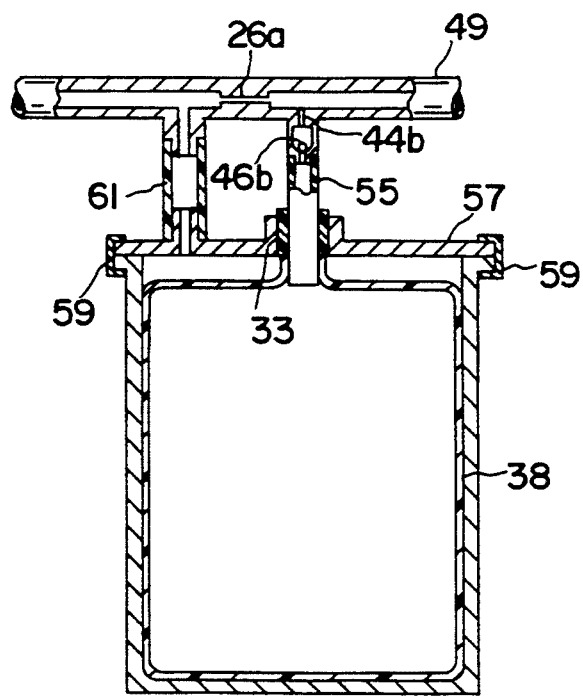
FIG. 5 is a sectional view taken through another mechanism embodying features of the invention.

FIG. 5 shows an alternate arrangement wherein the liquid fertilizer concentrate is located within the space defined by the flexible bag (rather than in the container space outside the bag). The fertilizer-containment bag is attached to a tube 55 that extends through an annular rubber closure 33. Closure plug 33 is insertable into an opening in a removable lid 57 for container 34b. An annular clamping ring 59 can be used to attach lid 57 to the container.

Bag 38b is shown in FIG. 5 in a condition substantially filled with liquid fertilizer concentrate. When the water system is pressurized the supply pressure (e.g. fifteen p.s.i.) is applied through branch line 61 to the container space surrounding bag 38b. A pumping force is thereby developed, whereby liquid fertilizer flows upwardly through tube 55 for mixture with the water flowing into line 49. Tube 55 constitutes a branch line corresponding to lines 42 and 42a of FIGS. 1 and 4. The branchline includes a constriction 44b and check valve 46b.

The fertilizer pumping action can be continued until flexible bag 38b is in a fully collapsed condition having a relatively small internal volume approaching a zero value.

The various illustrated forms of the invention are similar in that in each case an expansible bag or hollow membrane subdivides a relatively rigid container into a water space and a fertilizer space, with the two spaces being isolated from each other. Pressurized water is fed into the water space to exert a pumping force through the membrane wall and onto the contained fertilizer. The fertilizer is thereby pumped out of the container for mixture with water flowing through the passage system. The pumping force is made possible by the fact that the pressurized water (pumping medium) is taken from a point upstream from constriction 26 (or 26a), whereas the fertilizer is introduced to the water passage system at a point downstream from the constriction.

What is claimed is:

1. A mechanism for supplying a fertilizer solution to a multiple number of growing plants; said mechanism comprising a container; an expansible chamber means subdividing said container into a water space and a liquid fertilizer space, said spaces being isolated from each other; liquid fertilizer occuppying said fertilizer space; a pressurized passage system that includes a water passage having a constriction (26) therein, a first branch line (32) leading from a point in said water passage upstream from said constriction into said water space, whereby said expansible chamber means is pressurized to exert a pumping force on the fertilizer in the fertilizer space, a second branch line (42) leading from said fertilizer space to a point in said water passage downstream from said constriction, whereby liquid fertilizer is pumped out of the container for mixture with the water flowing through said water passage; and a check valve in said second branch line for preventing flow of water from the water passage through said second branch line into the fertilizer space.

2. The mechanism of claim 1, and further comprising a second construction in said second branch line; said second construction having a lesser cross sectional dimension than the first mentioned construction, whereby the fertilizer concentration is relatively small in the water flowing through the water passage.

3. The mechanism of claim 1, said container having a top wall that forms an upwardly open mouth; said expansible chamber means comprising a plug-type closure insertable into said upwardly open mouth, and a flexible bag depending from said plug-type closure so as to be within the container.

4. The mechanism of claim 3, wherein said flexible bag is collapsible so as to be capable of passage through the open mouth of the container; said open mouth constituting a means for introducing liquid fertilizer into the container when the plug-type closure is removed.

5. The mechanism of claim 3, wherein said first branch line comprises a tube extending through said closure into said bag.

6. The mechanism of claim 1, wherein said expansible chamber means has a maximum interior volume only slightly less than the container volume, whereby said expansible chamber means is enabled to pump substantially all of the liquid fertilizer out of the container.

7. The mechanism of claim 1, wherein said container comprises a hollow upright container body having a bottom wall and a top wall; said expansible chamber means comprising a flexible membrane extending downwardly from said top wall; said second branch line having a fertilizer admission port located adjacent to the bottom wall of the container, whereby said admission port is in liquid communication with the fertilizer until the fertilizer level drops to a point near the bottom wall.

* * * * *